Jan. 6, 1970     D. GRANDIN     3,487,565

BUCKET WHEEL ASSEMBLY FOR A ROTARY EXCAVATOR

Filed Dec. 11, 1967

INVENTOR.
DANIEL GRANDIN

BY *Kurt Kelman*

AGENT

United States Patent Office 3,487,565
Patented Jan. 6, 1970

3,487,565
BUCKET WHEEL ASSEMBLY FOR A ROTARY EXCAVATOR
Daniel Grandin, Seine-et-Marne, France, assignor to Societe Fives Lille-Cail, Paris, France
Filed Dec. 11, 1967, Ser. No. 689,662
Claims priority, application France, Dec. 20, 1966, 88,059
Int. Cl. E02f *3/24, 5/08;* A01b *33/00*
U.S. Cl. 37—189                                      6 Claims

ABSTRACT OF THE DISCLOSURE

Two motors driving the bucket wheel of an excavator are mounted on the stationary wheel shaft on opposite ends of a diametrical arm. The motors and the arm are enclosed in a sealed cavity formed by the wheel rim, by a wheel disc which connects the rim to the shaft, and by a sheet metal cover transverse to the axis of rotation, and are supplied with hydraulic fluid or electric current through the hollow shaft which has a free end in the cavity.

BACKGROUND OF THE INVENTION

This invention relates to rotary excavators, and particularly to the motor drive for the bucket wheel of the excavator.

It is common practice to mount a wheel carrying sharp-edged buckets on one end of a boom the other end of which is fastened to a vehicle which drives the buckets into the material to be excavated while the wheel rotates. The excavated material is dropped from the buckets on a conveyor, usually running along the boom, for further processing.

The wheel may be turned by a motor mounted on the vehicle through chains or the like, or the motor may be mounted on the boom adjacent the wheel. The chain transmission or a boom-mounted motor must be protected against dust and mechanical damage, and the necessary housing is usually bulky and quite heavy.

The object of the invention is the provision of a drive arrangement in which the motor is mounted on the boom of an excavator, but does not significantly contribute to the bulk of the machine, and increases the weight supported on the boom by very little over that of the wheel alone.

SUMMARY OF THE INVENTION

In one of its aspects, the invention mainly resides in a bucket wheel assembly in which a wheel rim centered on the axis of wheel rotation is connected to a shaft by a hub arrangement which includes a disc transverse to the axis and sealingly connected to the rim and to the shaft. Buckets project from the rim outwardly in angularly spaced relationship, as is conventional.

The wheel rim constitutes the circumferential wall of a substantially closed cavity whose axial walls are formed by the afore-mentioned disc and by a cover which is sealed to the rim and extends transversely of the axis of rotation. The motor drive for the wheel is arranged in the cavity and includes a prime mover.

Other features, additional objects and many of the advantages of this invention will become apparent from the following detailed description of a preferred embodiment, when considered in connection with the attached drawing.

DESCRIPTION OF THE PREFERRED EMBODIMENT

Figure 1:
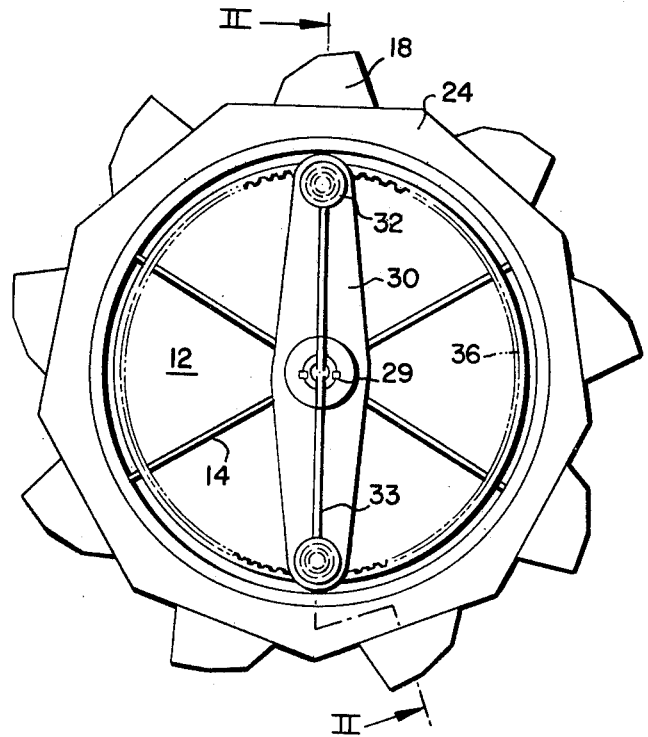
FIG. 1 shows a bucket wheel assembly of the invention in side elevation, without the wheel cover.
Figure 2:
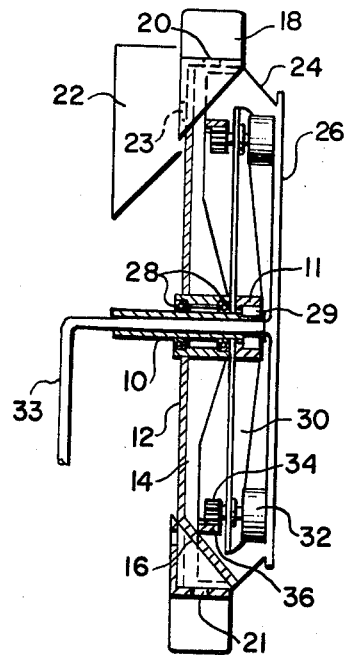
FIG. 2 shows the assembly of FIG. 1 with its cover, in section on the line II—II.

The drawing shows as much of a rotary excavator as is needed for an understanding of this invention. A hollow shaft 10 is attached to the non-illustrated boom of the excavator and carries the wheel proper, which includes a hub assembly including a tublular hub 11 and a wheel disc 12 reinforced by radial ribs 14, the disc and ribs being made of sheet metal. Chutes 16 and buckets 18 are distributed about the circumference of a polygonal wheel rim 20 which is welded to the disc 12 and the ribs 14. The buckets 18 project outwardly from the rim and are connected with the chutes 16 through radial passages 21 in the rim. A hopper 22 is fixedly mounted on the non-illustrated boom axially adjacent the top portion of the wheel to receive excavated material discharged from the chutes 16 through axial openings 23, and to transmit the material to a non-illustrated conveyor.

The rim structure also includes an approximately frustoconical sheet metal shroud 24 centered on the axis of rotation and flanged to a sheet metal cover 26 which is imperforate, except for non-illustrated openings in its circumference for bolts fastening the cover 26 to the flange of the shroud 24.

Anti-friction bearings 28 equipped with non-illustrated labyrinth-type seals connect the hub 11 to the shaft 10. Keys 29 secure the center portion of an arm 30 on the free end of the shaft 10 which is inwardly offset from the cover 26 in the cavity axially bounded mainly by the cover 26 and the disc 12, and circumferentially bounded mainly by the rim 20.

The two diametrically opposite ends of the arm 30 carry two hydraulic motors 32 to which energy is transmitted from a non-illustrated hydraulic pump of the excavator vehicle by pressure lines 33. The return lines for the hydraulic fluid have been omitted from the drawing for the sake of clarity. Pinions 34 on the output shafts of the motors 32 mesh with a circular rack 36 fixedly attached to the ribs 14 for transmitting motion from the motors 32 to the wheel rim 20 and to the buckets 18 mounted thereon.

The sealed wheel cavity is partly filled with non-illustrated fluid lubricant during operation of the wheel. It will be appreciated that the hydraulic lines 33 which emerge from an orifice at the free end of the shaft 10 in the cavity pass through a non-illustrated plug in the shaft which prevents lubricant leakage.

The motor and its associated transmission elements do not materially add to the bulk of the bucket wheel assembly. In a wheel having wider buckets than those illustrated in the drawing, they may not add at all to the axial length of the wheel assembly, the shroud 24 being unnecessary. The weight added by the drive arrangement is minimal as compared to known similar devices. The motor and transmission are safely protected from mechanical damage and from the dust prevailing under the normal working conditions of the excavator, and may be flooded with lubricant at all times.

What is claimed is:
1. A bucket wheel assembly for a rotary excavator comprising, in combination:
   (a) a shaft having an axis;
   (b) annular wheel rim centered on said axis;
   (c) hub means connecting said rim to said shaft for rotation of the rim about said axis;
   (d) a plurality of buckets outwardly projecting from said rim in angularly spaced relationship;

(e) a cover member fixedly mounted on said rim means in sealing engagement and extending transversely of said axis,
  (1) said rim constituting the circumferential wall of a substantially closed casing cavity;
  (2) said hub means including a disc member transverse to said axis and sealingly connected to said shaft and to said rim,
  (3) said cover member and said disc member substantially constituting the axial walls of said cavity; and
(f) drive means in said cavity for rotating said rim about said axis, said drive means including a prime mover.

2. An assembly as set forth in claim 1, further including a support in said cavity, means securing said support on said shaft against rotation about said axis, said prime mover being a motor mounted on said support, and motion transmitting means drivingly connecting said motor to said rim.

3. An assembly as set forth in claim 1, wherein said shaft has a free end in said cavity axially offset from said cover member, the cover member having an imperforate central portion.

4. An assembly as set forth in claim 3, further comprising energy transmitting means for supplying energy to said prime mover, said shaft being hollow, and said energy transmitting means extending inward of said cavity through the hollow shaft.

5. An assembly as set forth in claim 1, wherein said disc member is fixedly fastened to said rim means.

6. In an apparatus as set forth in claim 5, a hydraulic motor mounted on said shaft in a fixed angular position, the motor having an output shaft; a pinion fixedly mounted on said output shaft; and a circular rack secured to said hub means for rotation therewith, said pinion meshingly engaging said rack.

References Cited

UNITED STATES PATENTS

| | | | |
|---|---|---|---|
| 1,290,479 | 1/1919 | App | 37—190 |
| 2,190,325 | 2/1940 | Bemis et al. | 37—189 XR |
| 2,762,141 | 9/1956 | LeTourneau | 37—190 |
| 3,230,647 | 1/1966 | Gates | 37—190 |

FOREIGN PATENTS

| | | |
|---|---|---|
| 453,649 | 12/1949 | Italy. |
| 534,882 | 10/1931 | Germany. |
| 868,875 | 3/1953 | Germany. |

ROBERT E. PULFREY, Primary Examiner

C. D. CROWDER, Assistant Examiner

U.S. Cl. X.R.

172—125